Jan. 8, 1946.     R. G. YOUNG     2,392,626
FINGER REST
Filed May 12, 1944

INVENTOR:
ROGERS G. YOUNG
BY Edward Fisher
ATTORNEY

Patented Jan. 8, 1946

2,392,626

UNITED STATES PATENT OFFICE 2,392,626

FINGER REST

Rogers G. Young, St. Petersburg, Fla.

Application May 12, 1944, Serial No. 535,325

4 Claims. (Cl. 132—73)

This invention concerns an improvement in finger rests and spreaders, preferably in combination with manicure receptacle.

Primary object of this invention is the providing of a finger rest and spreader for use in polishing, enameling or shaping the nails, and wherein the nail tips are placed in an advantageous position for any of these or like purposes.

Other uses and advantages of this invention will no doubt appear in consideration of same.

Now referring to the drawing in which like reference characters indicate similar members:

Figure 1:
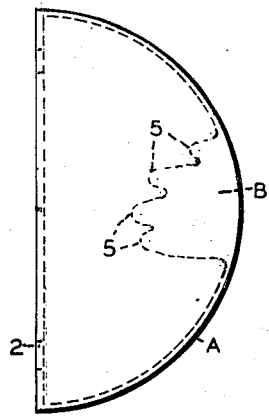
Fig. 1 is a plan view of this invention in combination with a closed receptacle.
Figure 2:
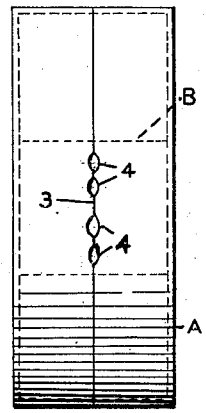
Fig. 2 is a front edge elevation thereof.
Figure 3:
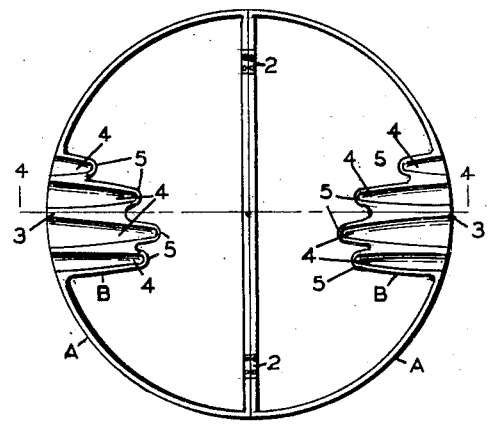
Fig. 3 is a plan view thereof, with receptacle in open position.
Figure 4:
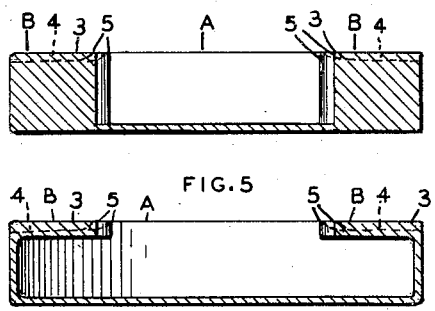
Fig. 4 is a sectional view on the line 4—4 Fig. 3.
Figure 5:
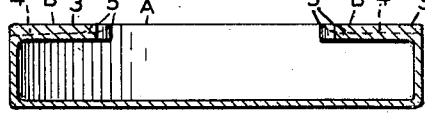
Fig. 5 is a sectional view similar to Fig. 3 but showing an alternate structure.

Now referring more particularly to the drawing, A indicates a receptacle which may be of the shape shown or of any other suitable shape, such as, square, oblong, or of a fanciful design, and if desired, hinged as shown at 2.

Oppositely disposed, forming a part of said receptacle, and extending thereinto are the finger rests and spreaders B the outer face corresponding to the shape of the receptacle and the inner edge being curvilinear corresponding to the length of the individual finger rests.

Within the resting surface 3 of said member B are spaced concaved and finger shaped portions 4, said portions being of a staggered or related length to each other corresponding to that of the fingers of an average human hand and spaced to provide means to spread the fingers when rested therein. This type of structure further allows the fingers to their tip end to be rested simultaneously in the concaved portions, and that portion of the finger nail which overhangs the finger tips to extend over the edge 5 and be free of the rest, thereby placing the overhanging portion of the nails in a convenient position for polishing, enameling, shaping and the like.

As illustrated in the drawing the rests are right and left and oppositely disposed, this provides a convenient arrangement for the user of the rests to work on the nails on one hand and then shift to the other hand without changing the position of the receptacle.

Figure 6:
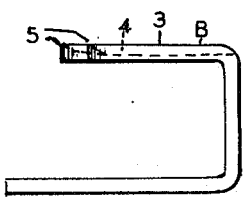
Fig. 6 is an end view of a form of my invention independent of a receptacle.

While I have shown my invention in combination with a receptacle which acts as a base therefor, it is obvious that finger rests of this type may be provided with a different base wherein they would be entirely independent from the receptacle, such, for instance, as shown in Fig. 6; in a block form or having a base of any other suitable and possibly fanciful shape.

It is thought the above description of structure and use of the invention will be thoroughly understood without further explanation, but it is obvious that the details illustrated and explained may be varied without departure from the novel subject matter. I do not therefore, desire to be limited by the disclosure but rather by the claims granted me.

What is claimed is:

1. An article of the character described having in combination a receptacle, the outer rim of which form a support for oppositely disposed finger rests which extend into said receptacle, said finger rests having a series of concaved portions of varied length corresponding to the related length of the fingers of an average hand, whereby, the fingers to their tip end may be rested simultaneously in the concaved portions and allow such portion of the finger nails as overhangs the finger tips to extend over the inner edge of the finger rest and be free therefrom for convenience in manicuring same.

2. An article of the character described having in combination a receptacle and oppositely disposed finger rests extended into said receptacle, said finger rests comprising a series of concaved portions, spaced to provide means for spreading the fingers when rested therein, and of a length whereby the fingers to their tip end may be rested simultaneously in the concaved portions and further allow such portion of the finger nails as overhangs the finger tips to be free of the finger rest for convenience in manicuring.

3. An article of the kind described having in combination a receptacle forming a base and a finger rest extending inward from the outer edge of said receptacle, said rest having within its face a series recessed finger shaped portions for resting the fingers of a hand therein and spaced to provide means to spread the fingers when rested therein.

4. An article of the kind described having a base with an upper angular portion extended therefrom, said base and angular portion having fan spread depressions to provide finger rests and finger spreading means, said angular portion having a curvilinear outer edge forming variation in the length of said depressions in conformity to variation of length of the fingers of a hand, and for allowing such portions of the finger nails as overhang the finger tips to extend over said curvilinear edge and be free from the finger rest for convenience in manicuring same.

ROGERS G. YOUNG.